United States Patent Office 3,005,784
Patented Oct. 24, 1961

3,005,784
POLYMERS CONTAINING AMIDE AND
CARBOXYLIC GROUPS
John F. Jones, Cuyahoga Falls, Ohio, and Robert M.
Summers, Schenectady, N.Y., assignors to The B. F.
Goodrich Company, New York, N.Y., a corporation
of New York
No Drawing. Filed Mar. 31, 1958, Ser. No. 724,789
16 Claims. (Cl. 260—2.1)

This invention relates to partial amides of polymeric alpha-beta unsaturated monocarboxylic or acrylic acids in which not more than about half of the carboxyl groups attached to the main polymer chain are amidified and to methods for their preparation and more particularly pertains to partial amides of polycarboxylic acids in which the amide groups are interspersed or attached to the main polymer chain so that not more than two adjacent carboxyl groups are converted to amide linkages and to methods for preparing the partial amides by treating polymeric anhydrides of the alpha-beta unsaturated monocarboxylic acids with ammonia or primary or secondary amines.

The polymeric anhydrides of alpha-beta unsaturated monocarboxylic acids or acrylic or substituted acrylic acids have a series of recurring

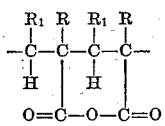

linkages which may be referred to as alpha-methylene glutaric anhydride groups. In the above formula R represents hydrogen, chlorine, fluorine, bromine, a cyano group, an alkyl group having from 1 to about 10 carbon atoms an aryl group, an aralkyl group or an alkaryl group and $R_1$ represents hydrogen, chlorine, bromine and fluorine. Thus, the polymer is a polymeric anhydride of acrylic acid or a substituted derivative thereof. When the anhydride polymer is reacted with a primary or secondary amine or ammonia the anhydride group is ruptured and the reaction is controlled, so that only one of the carboxyl groups is amidified and the other carboxyl group is converted to the ammonium or amine salt, except in the case of very weakly basic amines such as aniline where an amide group is formed without amine salt formation.

Prior to my invention this type of spacing of amide groups on an acrylic polymer chain was not possible. Copolymers of acrylic and substituted acrylic acids with acrylamide or substituted acrylamides are known. In these copolymers, however, the spacing of amide groups attached to the main polymer chain is more or less random and not evenly distributed. The even distribution of the amide groups along the chain provides some rather unusual properties in the polymers.

One method of preparing linear anhydride polymers comprises polymerizing glacial acrylic acid or as substituted derivatives thereof in the presence of an inert diluent such as benzene and an excess of a dehydrating agent such as acetic anhydride, in the presence of catalytic amounts of a free radical catalyst at a temperature of about 50° C. to about 70° C.

Cross-linked acrylic anhydride polymers in which the cross-links are not destroyed by scission of the anhydride linkages can be prepared by copolymerizing a polyunsaturated monomer, such as a polyallyl sucrose having at least three allyl groups per sucrose molecule, with a glacial acrylic acid or a substituted derivative thereof in an inert diluent and in the presence of a free radical polymerization catalyst and in the presence of a dehydrating agent, such as acetic anhydride. These polymeric anhydrides and their methods of preparation are described more fully and claimed in the copending application Serial No. 555,308, filed December 27, 1955, by John F. Jones.

The monocarboxylic, alpha-beta unsaturated carboxylic acids that can be used in preparing the anhydride polymers have the structure

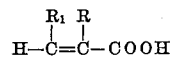

in which R and $R_1$ each has the same designation as above. Specific anhydride polymers are those made from acrylic acid, methacrylic acid, alpha-ethyl, propyl, butyl, amyl, hexyl, heptyl, octyl, nonyl, and decyl acrylic acids, alpha-chloro, bromo and fluoro acrylic acids, alpha-cyano acrylic acid, alpha-benzyl acrylic acid, alpha-tolyl acrylic acid and other alpha-substituted acrylic acids with hydrocarbon substituents up to about 10 carbon atoms. The preferred anhydride polymers are those made from acrylic, methacrylic, alpha-chloro acrylic and alpha-cyano acrylic acid. The most preferred anhydride polymers are those made from acrylic and methacrylic acid and mixtures of said acids. All these anhydride polymers contain the recurring generic structure:

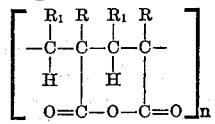

in which $n$ is an integer greater than 1 and R and $R_1$ have the same designation as above. If the anhydride polymer is a homopolymer each R will represent the same substituent and $R_1$ will also represent the same group. If the anhydride is prepared from a mixture of different acrylic or substituted acrylic acids then R and $R_1$ may each be different and may be one or more of the substituents defined above.

The partial amide derivatives of this invention can be formed by reacting the anhydride polymer with a primary amine, a secondary amine or ammonia gas in an inert diluent such as a liquid hydrocarbon or liquid halogenated hydrocarbon. The amines can be either saturated or unsaturated, aliphatic, alicyclic or aromatic. No catalyst is usually necessary. The reaction proceeds well at room temperature and is usually complete in about one hour, but elevated temperatures with shorter time can be used if desired. Under these mild conditions an excess of the amines or ammonia react to form one amide group with each anhydride linkage and the other carboxyl group is converted to the ammonium or amine salt, excepting that with very weakly basic amines the carboxyl group remains unreacted. If one mole of ammonia or amine for each anhydride group is reacted the half amide is formed and the carboxyl group remains unreacted. Less than one mole of ammonia or amine for each anhydride group provides a polymer with amide groups, free carboxyl groups and unreacted anhydride groups.

Specific amines that can be employed for amide formation include methyl amine, dimethyl amine, ethyl amine, diethyl amine, propyl and dipropyl amines, the amyl, hexyl, heptyl, octyl, nonyl, decyl, undecyl, dodecyl, tetradecyl, octadecyl and eicosyl amines; aniline, toluidines, xylidines, mesitylene, cumidine, phenylene diamines, tolylene diamines, mixed aromatic-aliphatic secondary amines such as n-methyl aniline, n-ethyl aniline and other n-alkyl substituted aromatic amines.

The reaction of primary and secondary amines with the anhydride polymer produces the structural units:

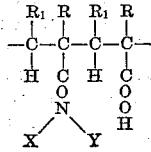

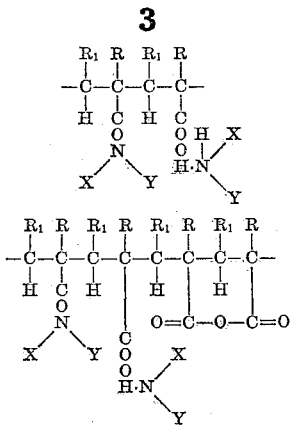

wherein R and $R_1$ have the same designation as above, X represents hydrogen and a hydrocarbon having from 1 to 20 carbon atoms and Y represents hydrogen and a hydrocarbon having from 1 to 20 carbon atoms. As indicated above these different structures can be formed by regulating the amount of amine or ammonia reacted with the anhydride.

It is possible to have amide, free carboxyl, anhydride and amine salt groups on the same polymer chain by reacting the polymer with less than stoichiometric quantities of primary or secondary amine or ammonia to form a polymer having from as low as about 0–5% to as much as about 80% of the anhydride groups unreacted. In this manner finished end products of a very wide variety of desirable characteristics can be prepared.

The examples which follow are intended as illustrative and not as limitations on the invention. All parts are by weight unless otherwise specified.

EXAMPLE I

To a mixture of about 10% glacial acrylic acid and 90% benzene was added a mole of acetic anhydride for each mole of acrylic acid. Sufficient benzoyl peroxide was added to provide a concentration of 2% based on the acrylic acid. Air was swept out of the polymerization flask with nitrogen, the flask was sealed and the temperature was adjusted to 50° C. After about 16 hours the reaction was complete and the linear polyacrylic anhydride formed as a white, fluffy powder suspended in benzene. The polymer was filtered, washed with benzene and then dried in a vacuum oven at 50° C.

Polymethacrylic anhydride is prepared by substituting glacial methacrylic acid for acrylic acid and following the technique described above.

Ammonia, primary amines and secondary amines in the substantial absence of water react with the anhydride linkages on the polymer to form derivatives having a plurality of

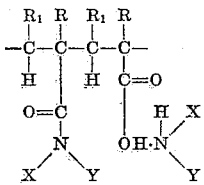

or amide and free carboxyl or amide, free carboxyl and unreacted anhydride groups as part of the main polymer chain. In the above formula R, $R_1$, X and Y each represents the groups defined heretofore.

The salt formation occurs with all except very weak amines such as aniline, in which case the amide is formed but the carboxyl group remains free and unreacted.

The partial amides can be prepared by preparing a mixture of the anhydride and the amine in an inert solvent in which the amine is soluble, preferably a liquid aromatic hydrocarbon, and heating the mixture to about 50° C. No catalyst is needed. The reaction is quite rapid and is usually complete in about an hour. Alternately, the process can be carried out by dissolving the linear anhydride polymer in a solvent such as dimethylformamide, or dimethyl sulfoxide or other solvents which do not react with the anhydride, adding the amine and heating to about 50° C. for about an hour.

The heating step is employed only to speed the reaction, since the same derivative can be obtained at room temperature or lower, but in a longer time.

The reaction will also take place in the absence of a diluent if the amine is liquid at reaction temperature.

The partial amides are unique in that they are good emulsifiers, and good suspending agents over a very wide pH range.

A mixture of 22 grams of linear polyacrylic anhydride and 17.8 grams of 3-N,N-dimethylamino-propyl amine was prepared and held at room temperature overnight. The amount of amine is equal to about two moles for each mole of anhydride groups.

The derivative which formed was removed from the small amount of unreacted amine, washed with benzene and dried. The polymeric derivative contained 10.85% nitrogen, which showed that about 71% of the anhydride groups were converted to amide-amine salts.

A number of aqueous 10% solutions of the derivative were prepared. At this concentration the pH of the solution was 5.85 and had a viscosity of 240 as determined on a Brookfield viscosimeter, using a No. 4 spindle at 20 r.p.m.

The pH of the remaining 10% solutions were adjusted to various levels by the addition of NaOH or HCl. The viscosity at the various pH levels was determined. These data are shown in the table below:

Table I

| pH | 5.6 | 5.0 | 4.6 | 4.0 | 2.4 | 7.8 |
|---|---|---|---|---|---|---|
| Viscosity | 84 | 72 | 44 | 40 | 48 | 40 |
| pH | 7.4 | 8.0 | 9.1 | 9.7 | 10.0 | 10.4 |
| Viscosity | 180 | 192 | 188 | 168 | 168 | 204 |

The viscosity behavior over so wide a pH range is very unique, and is typical of the partial amides.

EXAMPLE II

A series of linear polyacrylic anhydrides were prepared by polymerizing 20 grams of glacial acrylic acid in the presence of 34 grams of acetic anhydride, 200 ml. of benzene, 0.4 gram of diisoazobutyronitrile. In each case the polymer was washed thoroughly with benzene and then re-suspended in 200 ml. of fresh benzene.

The following amines were employed in preparing partial amides.

Amine:                                    Quantity of amine
                                          in grams
  Diethyl imino diacetate _____ 30
  n-Butyl amine _____ 11.6
  Piperidine _____ 13.5
  Diisobutyl amine _____ 20.4
  p-Amino-acetophenone _____ 21.3
  1-amino-anthraquinone _____ 35.3
  4-amino biphenyl _____ 26.9
  Amino silane _____ 15
  Benzylamine _____ 16.9
  m-Bromo-aniline _____ 27.2

In preparing the partial amides, the amine was added to the benzene slurry of polyacrylic anhydride, the bottles were sealed and then rotated for 24 hours at 50° C. Each of the partial amides was soluble in dimethyl formamide and with the exception of the 4-amino-biphenyl derivative, all were soluble in 5% NaOH.

EXAMPLE III

Another series of partial amides was prepared by treating a benzene slurry containing 44 grams of linear polyacrylic anhydride with varying amounts of the amines listed below:

| Amine | Wt. of Amine in Grams | Barcol Hardness |
|---|---|---|
| Di-2-ethyl hexylamine | 84 | |
| Aniline | 32.3 | 42 |
| 2-naphthylamine | 49.7 | 30 |
| n-hexylamine | 35.1 | |
| Dicyclohexyl amine | 63 | 33 |
| Dimethylamine | 35.5 | |
| Propylamine | | 30 |
| Cyclohexylamine | 34.4 | 25 |

The Barcol hardness was determined on each derivative after molding into pellet form. All of these polymers are excellent adhesives.

EXAMPLE IV

A cross-linked polyacrylic anhydride was prepared by treating 25 grams of a copolymer of 99% acrylic acid and 1% allyl sucrose having 5.6 allyl groups per sucrose molecule with 500 ml. of acetic anhydride under reflux for 4 hours. The so treated copolymer was washed with benzene to remove the acetic anhydride-acetic acid mixture, and then the cross-linked polyacrylic anhydride-allyl sucrose copolymer was suspended in 500 ml. fresh benzene.

Other partial esters were made with methanol, 8-hydroxy-quinoline n-octanol and isopropanol. Partial amide derivatives of the cross-linked polyacrylic anhydride were prepared by reacting the anhydride with equimolar amounts of ammonia, beta-dimethylamino propyl amine, dipyridyl amine and n-(2-aminoethyl) morpholine.

Each of the partial amide derivatives was an exceptional suspending agent at low pH values in aqueous media.

EXAMPLE V

A copolymer of 90% acrylic acid and 10% allyl sucrose, having 5–6 allyl groups per sucrose molecule was converted to its anhydride form by refluxing with acetic anhydride. The anhydride polymer was filtered, washed free of acetic anhydride and resuspended in benzene and an equimolar amount of b-diethyl amino propyl amine was added to the slurry and the polymeric partial amide was made by the same procedure described above. This partial amide derivative had a nitrogen content of 7.35%. This polymeric material was a good ion exchange resin.

EXAMPLE VI

An excess of methallylamine was added to a 10% by weight solution of linear polyacrylic anhydride dissolved in dimethyl sulfoxide and held at 100° F. for 24 hours. The derivative was precipitated with hexane, filtered and dried. It was soluble in aqueous ammonium hydroxide. A film which was cast from the aqueous solution was dried in an oven at 250° F. for one-half hour was only slightly sensitive to water.

The polymeric anhydride will react with complex naturally occurring polyamides containing primary or secondary amines. Wool yarn immersed in a 10% solution of polyacrylic anhydride at 50° C. will increase in weight about 33% and will swell when treated with soapy water.

Casein will also react to form a very viscous, thick gel in water. Milk washed casein after reaction with polyacrylic anhydride becomes water-insoluble.

Gelatin forms a very thick gel in a dimethylformamide solution of polyacrylic anhydride. The gel will swell in water, but will not dissolve and the thermoreversibility of the gel is no longer apparent.

EXAMPLE VII

A sample of 126 grams of polyacrylic anhydride in 1500 ml. of dry benzene was treated with 17 grams of anhydrous ammonia in an apparatus equipped with mechanical stirrer and Dry Ice-acetone condenser. The reaction between the anhydride polymer and the ammonia was exothermic. The stirred mixture was allowed to react for 16 hours and the mixture was then heated to 45–50° C. for 15 hours. A yield of 140 grams of dry polymer (98% of theory) having the following analysis was obtained.

| | Calculated | Found |
|---|---|---|
| Percent N | 9.79 | 9.29 |
| —COOH (milliequivalent/gram) | 6.99 | 6.74 |

This half amide of polyacrylic anhydride was soluble in water, dimethylformamide, pyridine, acetone, acetonitrile, ethyl acetate and tetrahydrofuran.

When more than one equivalent of ammonia was used in the above procedure the partial ammonium salt of the half amide of polyacrylic anhydride was obtained. The half amide as well as its ammonium salts are excellent adhesive compositions.

The copolymeric, cross-linked anhydrides can be used in place of the linear polyacrylic anhydrides to prepare partial amide derivatives by following the procedures described for linear polyacrylic anhydride.

Partial amides of linear or cross-linked polymethacrylic anhydride can be made by the procedures described above.

EXAMPLE VIII

Polymethacrylic anhydride is prepared by the procedure described in Example I. A 50 g. sample of polymethacrylic anhydride is suspended in 500 ml. of benzene and 58 g. of dimethallyl amine is added to the slurry. The mixture is stirred at 50° C. for four hours and the resulting derivative is isolated by suction filtration. The powdery partial amide polymer softens at 116° C. and flows at 198° C. and a fused pellet of this polymer has a Barcol hardness of 45. Molded articles can be made from this partial diallyl amide polymer.

EXAMPLE IX

To solutions each consisting of 5 g. of polymethacrylic anhydride in 20 ml. of dimethylformamide were treated with 5 grams of dimethylaminopropyl amine and 2-aminopyridine respectively. These solutions are excellent adhesive cements.

The above examples serve merely to illustrate and not to limit the scope of our invention of these new polymeric compositions having amide and carboxyl groups on the main polymer chain, said amide and carboxyl groups being so interspersed that not more than one acyl group of each anhydride group on a parent polyanhydride is amidified said scope being fully defined in the appended claims.

We claim:

1. The reaction product of a polymer consisting essentially of anhydride units of the structure $$\begin{array}{c} H\ R\ H\ R \\ |\ \ |\ \ |\ \ | \\ -C-C-C-C- \\ |\ \ \ \ \ \ \ \ |\ \ \ \ \ \ \ \ \\ H\ \ \ \ H\ \ \ \ \ \\ O=C\ \ \ \ \ \ C=O \\ \ \ \backslash\ /\ \ \ \\ O \end{array}$$

wherein R is a member of the class consisting of hydrogen and an alkyl group having from 1 to 10 carbon atoms with at least 20 mole percent based on said anhydride units of an amine having the structure $$X-N-Y \atop |\ H$$

wherein X is a member of the class consisting of hydrogen and a hydrocarbon group having from 1 to 20 carbon atoms and Y is a member of the class consisting of hydrogen and a hydrocarbon group having from 1 to 20 carbon atoms.

2. The reaction product of a polymer consisting essentially of anhydride units of the structure

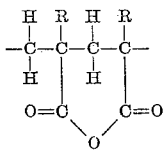

wherein R is hydrogen with at least 20 mole percent based on said anhydride units of an amine having the structure

wherein X is a member of the class consisting of hydrogen and a hydrocarbon group having from 1 to 20 carbon atoms and Y is a member of the class consisting of hydrogen and a hydrocarbon group having from 1 to 20 carbon atoms.

3. The reaction product of a polymer consisting essentially of anhydride units of the structure

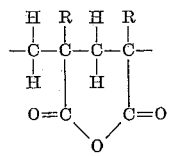

wherein R is methyl with at least 20 mole percent based on said anhydride units of an amine having the structure

wherein X is a member of the class consisting of hydrogen and a hydrocarbon group having from 1 to 20 carbon atoms and Y is a member of the class consisting of hydrogen and a hydrocarbon group having from 1 to 20 carbon atoms.

4. The reaction product of a polymer containing (1) from 90 to 99% by weight of anhydride units of the structure

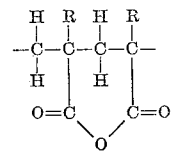

wherein R is hydrogen and (2) from 1 to 10% by weight of non-hydrolyzable interchain links with at least 20 mole percent based on said anhydride units of an amine having the structure

wherein X is a member of the class consisting of hydrogen and a hydrocarbon group having from 1 to 20 carbon atoms and Y is a member selected from the group consisting of hydrogen and a hydrocarbon group having from 1 to 20 carbon atoms.

5. The reaction product of a polymer containing (1) from 90 to 99% by weight of anhydride units of the structure

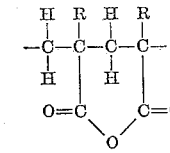

wherein R is methyl and (2) from 1 to 10% by weight of non-hydrolyzable interchain links with at least 20 mole percent based on said anhydride units of an amine having the structure

wherein X is a member selected from the class consisting of hydrogen and a hydrocarbon group having from 1 to 20 carbon atoms and Y is a member selected from the class consisting of hydrogen and a hydrocarbon group having from 1 to 20 carbon atoms.

6. The composition of claim 5 wherein X is an alkyl group having from 1 to 20 carbon atoms and Y is an alkyl group having from 1 to 20 carbon atoms.

7. The reaction product of linear polyacrylic anhydride with at least 20 mole percent based on the anhydride groups present in said polyacrylic anhydride of ammonia.

8. The reaction product of linear polyacrylic anhydride with at least 20 mole percent based on the anhydride groups present in said polyacrylic anhydride of dimethyl amine.

9. The reaction product of linear polyacrylic anhydride with at least 20 mole percent based on the anhydride groups present in said polyacrylic anhydride of n-hexyl amine.

10. The reaction product of linear polyacrylic anhydride with at least 20 mole percent based on the anhydride groups present in said polyacrylic anhydride of N,N-di-2-ethylhexyl amine.

11. The reaction product of linear polyacrylic anhydride with at least 20 mole percent based on the anhydride groups present in said polyacrylic anhydride of N,N-dimethallyl amine.

12. The method for preparing a polymeric partial amide comprising reacting a polymer consisting essentially of anhydride units of the structure.

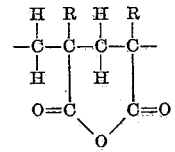

wherein R is a member of the class consisting of hydrogen and an alkyl group having from 1 to 10 carbon atoms with at least 20 mole percent based on said anhydride units of a compound of the structure

wherein X is a member of the class consisting of hydrogen and a hydrocarbon group having from 1 to 20 carbon atoms and Y is a member of the class consisting of hydrogen and a hydrocarbon group having from 1 to 20 carbon atoms at a temperature up to about 75° C.

13. The method for preparing a polymeric partial amide comprising reacting a polymer consisting essentially of anhydride units of the structure

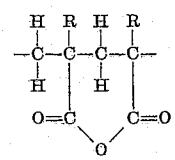

wherein R is a member of the class consisting of hydrogen and an alkyl group having from 1 to 10 carbon atoms with at least 20 mole percent based on said anhydride units of a compound of the structure

wherein X is a member of the class consisting of hydrogen and a hydrocarbon group having from 1 to 20 carbon atoms and Y is a member selected from the group consisting of hydrogen and a hydrocarbon group having from 1 to 20 carbon atoms at a temperature up to about 75° C. in an inert organic diluent.

14. The method of claim 13 wherein the inert organic diluent is benzene.

15. The method of claim 13 wherein the inert organic diluent is dimethyl formamide.

16. The method of claim 13 wherein the inert organic diluent is dimethyl sulfoxide.

References Cited in the file of this patent

UNITED STATES PATENTS

| | | |
|---|---|---|
| 1,984,417 | Mark | Dec. 18, 1934 |
| 2,146,209 | Graves | Feb. 7, 1939 |
| 2,461,023 | Barnes et al. | Feb. 8, 1949 |
| 2,469,696 | Minsk | May 10, 1949 |
| 2,698,316 | Glammaria | Dec. 28, 1954 |

FOREIGN PATENTS

| | | |
|---|---|---|
| 630,016 | Great Britain | Oct. 4, 1949 |
| 497,183 | Italy | Aug. 27, 1954 |
| 519,392 | Canada | Dec. 13, 1955 |